United States Patent [19]
Bourton

[11] 3,856,459
[45] Dec. 24, 1974

[54] HEATERS
[75] Inventor: Dennis Frederick Bourton, Canterbury, England
[73] Assignee: Canterbury Precision Engineering Limited, Canterbury, Kent, England
[22] Filed: July 19, 1973
[21] Appl. No.: 380,843

[30] Foreign Application Priority Data
July 27, 1972  Great Britain............... 35125/72

[52] U.S. Cl....................... 432/58, 302/17, 432/14
[51] Int. Cl............................................. F27b 15/00
[58] Field of Search ............... 432/14, 58; 302/17; 219/374

[56] References Cited
UNITED STATES PATENTS

| | | | |
|---|---|---|---|
| 2,983,500 | 5/1961 | Finley et al. | 432/36 |
| 3,265,445 | 8/1966 | Cronin | 302/17 |
| 3,307,840 | 3/1967 | Conroy, Jr. | 432/58 |
| 3,307,915 | 3/1967 | Conroy et al. | 432/36 |
| 3,544,089 | 12/1970 | Ledent | 432/58 |

*Primary Examiner*—John J. Camby
*Attorney, Agent, or Firm*—Morgan, Finnegan, Durham & Pine

[57] ABSTRACT

Portable gas heater comprises a pressure vessel with an inlet for connection to a source of pressurized gas. The vessel has one or more outlets and contains an electrical heater. One outlet may be connected to provide heated pressurised gas for conveying bulk material in a conveyor. A further outlet may be connected to an input hopper to heat bulk material in the hopper.

4 Claims, 1 Drawing Figure

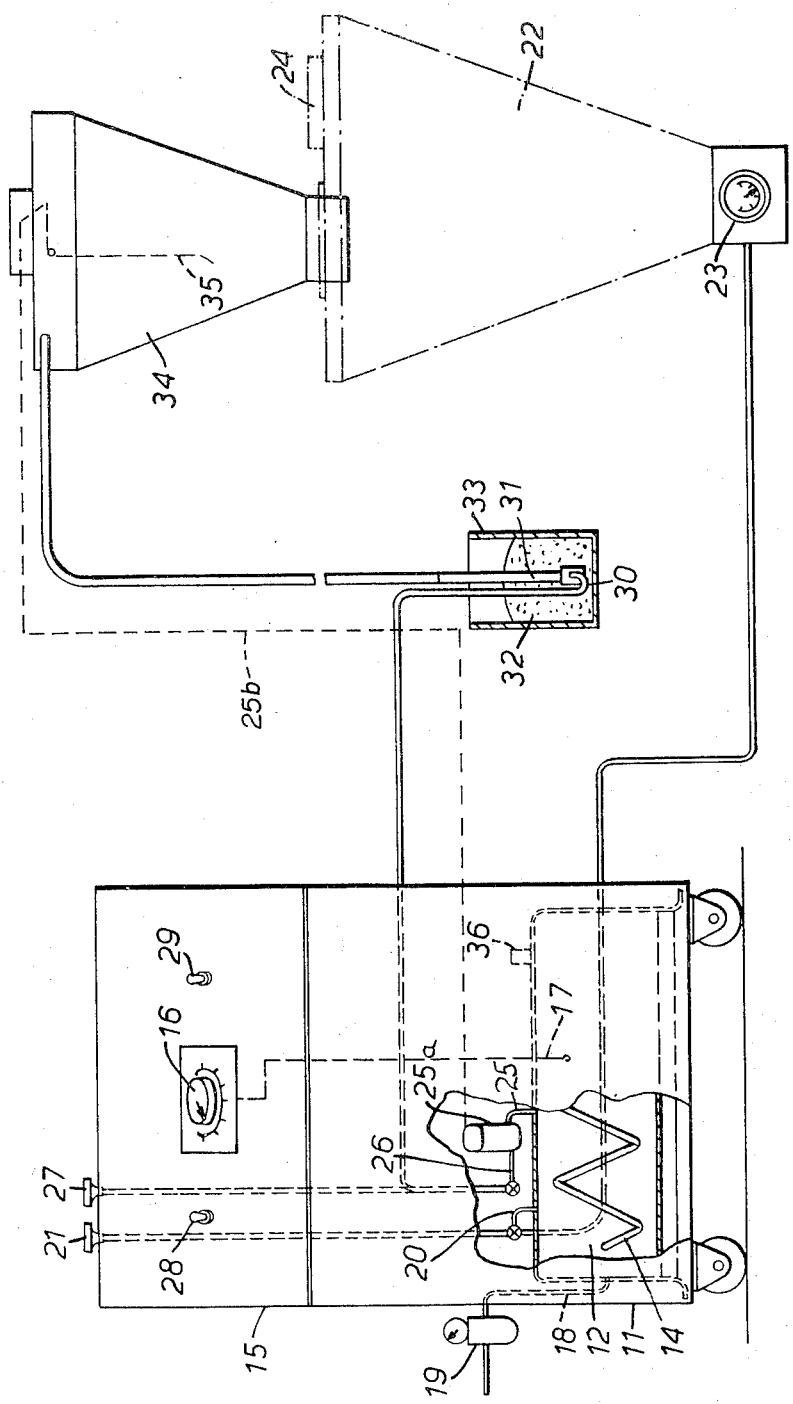

HEATERS

The invention relates to heaters, more particularly but not exclusively, to heaters for use in conjunction with conveyor arrangements for conveying bulk materials in granulated or powdered form.

According to one aspect of the invention there is provided a portable gas heater which comprises a pressure vessel having an inlet arranged to be connected to a source of pressurized gas, at least one outlet therefrom and electrical heating means located within the pressure vessel.

Preferably the or each outlet has valve means connected therewith.

At least one of the outlets may be fed via solenoid operated valve closure means.

The pressure vessel may be contained within and spaced apart from an outer casing therefor.

Temperature sensing means may be located in the pressure vessel and electrically connected to control means which controls the supply of heating current to the electrical heating means.

The heater may be connected to form part of a conveyor for bulk materials, one said outlet being connected to supply heated pressurised gas for conveying said bulk material.

A further said outlet may be connected to an input hopper of a machine utilising bulk material to heat bulk material contained in such input hopper.

According to a further aspect of the invention there is provided a conveyor arrangement comprising a conveyor pipe, at least one inlet tube having an orifice located at or within an open mouth of the pipe for injecting a high velocity of fluid directly into the mouth of the pipe and heater means arranged upstream of the inlet tube arranged to heat the high velocity stream of fluid prior to it being fed to the inlet tube, the arrangement being such that when the mouth of the pipe is located next adjacent bulk material in liquid, powdered or granular form, the bulk material is induced into the open mouth of the pipe in response only to a suction effect created thereat by the stream of heated fluid injected therein and the bulk material is carried along the pipe exclusively as a result of the high velocity stream of heated fluid injected therein.

Preferably the heater means comprises a heater as defined in any one of the second to eighth paragraphs herein.

The foregoing and further features of the invention may be more readily understood from the following description of a preferred embodiment thereof, by way of example, with reference to the accompanying drawing, which is a side elevational view, part cut away, of a heater connected in a conveyor arrangement for bulk material.

Referring now to the drawing there is shown a heater 11 which comprises a tubular pressure vessel 12 contained within an outer casing 13. The vessel 12 is spaced apart from the casing 13 along its length and spaced by asbestos sheets (not shown) at each end thereof. An electrical heating element 14 is located in the pressure vessel 12 and connected to be controlled by a control unit 15 which includes a setting dial 16, which includes a thermostat connected to a temperature sensor 17 in vessel 12.

An inlet 18 to the vessel 12 is connected via a cleaning unit and relief valve 36 to a supply of pressurised fluid, e.g., a compressed air line, not shown. The relief valve 19 incorporates an indicator and is set to the safe working pressure of vessel 12, so that such pressure is not exceeded.

An outlet 20 from vessel 12 is connected via a manually operable control valve 21 to the bottom of an input hopper 22 which would be mounted on a machine to feed such machine in use. A temperature gauge 23 is also mounted in hopper 22. The inlet to hopper 22 and gauge 23 may be provided in an annular member which would be located at the base of hopper 22. The hopper 22 has an upper vent 24 located at the top thereof.

A further outlet 25 from vessel 12 is fed to a solenoid operated control valve 25a which forms part of control unit 15. An outlet 26 from valve 25 is led to a manually operable control valve 27. The control unit 15 has a master switch 28 for controlling the whole device and a further switch 29 for controlling the valve 25.

The outlet from valve 27 is connected to supply an inlet tube 30 located in the open mouth of a conveyor pipe 31 which is shown depending into a supply of bulk material 32 in a container 33. The conveyor pipe 31 leads to the top of a supply hopper 34 which is located above input hopper 22. A sensing device 35 is located in hopper 34 and connected to control valve 25 a through line 25b.

In use the inlet 18 is connected to a compressed air line at mains pressure, i.e., 80 to 100 p.s.i. The dial 16 is set to a required temperature and the switch 28 actuated to supply current to heater element 14. Heated air is bled from vessel 12 via outlet 20 to heat any material contained in hopper 22. When such material has reached the required temperature, as indicated by gauge 23, the utilisation machine can be switched on. When this point is reached the switch 29 is actuated so that valve 25 opens and allows a high velocity stream of heated air to be injected from inlet tube 30 into the mouth of conveyor pipe 31. This causes a suction effect within pipe 31 and bulk material 32 is fed through pipe 31 exclusively thereby to hopper 34 and thence to hopper 22. The bulk material being conveyed is thus preheated as it is being conveyed and then further heated in hopper 22. Should the material rise to the level of sensor 35 a signal is passed to close valve 25 and prevent further material from being conveyed to hopper 34.

Although the heater 11 is particularly suited for use with the conveyor arrangement shown it could be utilised with any other conveyor system and for example merely be utilised to heat material in the input hopper 34. Further it could be used as a space or room heater in a workshop or other area having a source of compressed air.

The vent 24 may be closable to allow rapid heating of input hopper 22.

I claim:

1. A device for heating and conveying bulk material which comprises: a gas heater including a pressure vessel having inlet means and outlet means, said inlet means being arranged to be connected to a source of pressurized gas, and electrical heating means located within said pressure vessel for heating said gas therein; and a bulk material conveyor system including an inlet hopper having a lower end and adapted to receive and dispense bulk material and a pneumatic conveyor pipe adapted to convey bulk material from a source to said hopper; said outlet means including means for delivering heated pressured gas to said pneumatic tube for preheating and conveying said bulk material to said hopper and means for delivering heated gas to the lower end of said hopper for heating bulk material therein.

2. The device of claim 1 further including a supply hopper adapted and arranged to receive bulk material from said conveyor pipe and direct said material into said input hopper; and a system for controlling the conveying of bulk material including sensor means located in said supply hopper for sensing the level of material therein, and valve closure means in said outlet means responsive to said sensor means for controlling the flow of gas to said conveyor pipe.

3. A heater as claimed in claim 1 wherein the pressure vessel is contained within and spaced apart from an outer casing therefor.

4. The device of claim 1 further including temperature sensing means located in the pressure vessel and control means electrically coupled to said temperature sensing means and adapted to control the supply of heating current to the electrical heating means.

* * * * *